June 9, 1959   R. F. RISSE   2,889,910
BORING TYPE MINER
Original Filed Nov. 23, 1956   3 Sheets-Sheet 1
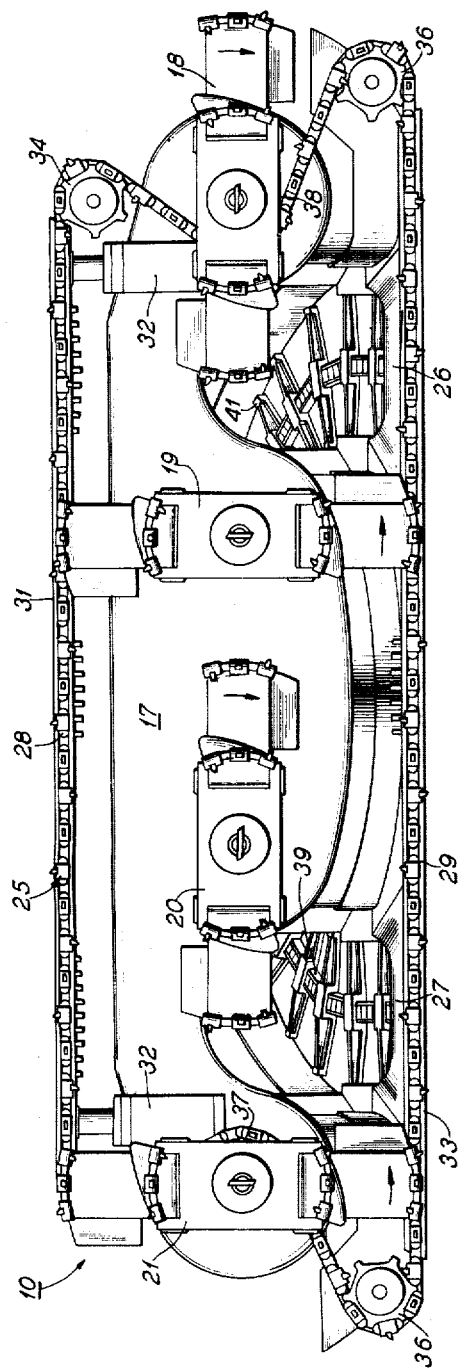
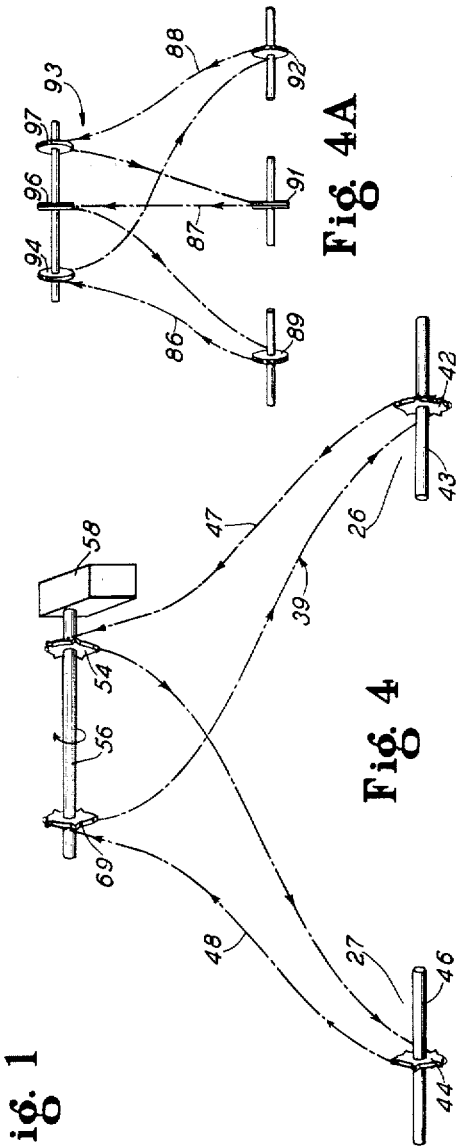
INVENTOR.
Ralph F. Risse
BY
Murray A. Gleeson
ATTORNEY June 9, 1959 R. F. RISSE 2,889,910
BORING TYPE MINER Original Filed Nov. 23, 1956 3 Sheets—Sheet 2

INVENTOR.
Ralph F. Risse
BY
Murray A. Gleeson
ATTORNEY

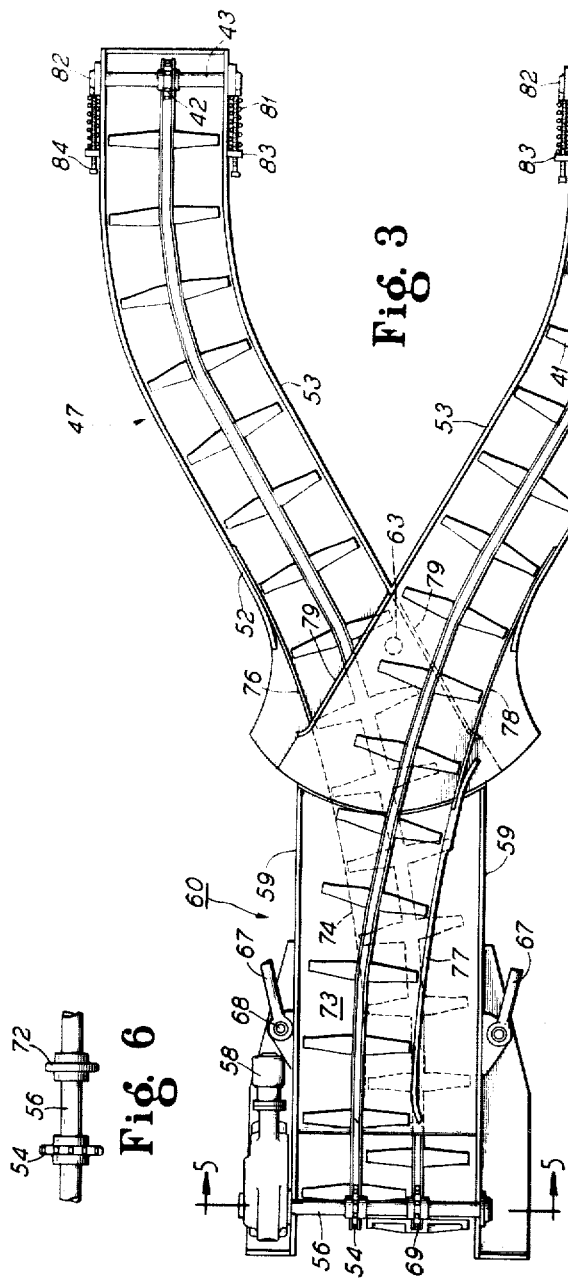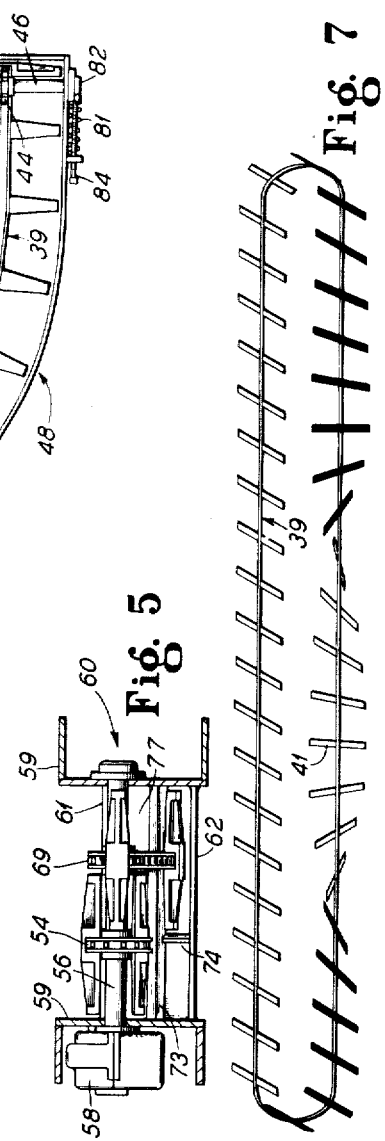

United States Patent Office 2,889,910
Patented June 9, 1959

2,889,910
BORING TYPE MINER

Ralph F. Risse, Chicago, Ill., assignor to Goodman Manufacturing Company, Chicago, Ill., a corporation of Illinois Continuation of application Serial No. 623,933, November 23, 1956. This application July 21, 1958, Serial No. 753,854

6 Claims. (Cl. 198—7)

This invention relates generally to continuous miners of the boring type, and more particularly to a boring type miner having multiple pairs of boring heads, and characterized by a single endless flight conveyor having a plurality of conveying runs each serving a pair of boring heads.

In Boesewetter Patent No. 2,834,588, issued May 13, 1958 for Boring Type Mining Machine Having Four Boring Heads, there is disclosed a boring type miner having four boring arms, each pair of arms delivering cuttings to the material receiving throat of an endless conveyor. The two endless conveyors are in cascade relationship with a discharge conveyor at the outby end of the machine, discharging the cuttings on to a belt conveyor, shuttle car or the like. Such a machine is generally suitable except for operation in low coal, since it is difficult to maintain a desirably low overall height by reason of the cascade relationship of the conveyors.

I have found that an endless flight conveyor made of a single endless strand can be so trained as to provide a plurality of conveying runs or reaches, each conveying run being arranged to receive the cuttings from a pair of boring arms, the conveying runs being arranged to converge toward each other in substantially a common plane to form a single discharge portion consisting of two side by side or intermeshed conveying reaches. Such discharge portion can be swiveled to follow the position of a shuttle car or other transport means behind the miner.

With the foregoing considerations in mind it is a principal object of this invention to provide a continuous miner having multiple pairs of boring arms, each pair of boring arms being arranged to have the cuttings therefrom removed by a flight conveying reach which is part of a single endless conveyor of such type.

Another object is to provide a mining machine having a pair of spaced material receiving throats, each such throat having a conveying reach of a flight conveyor thereat, each such reach being part of a single endless conveyor for the entire machine, such conveying reaches being substantially in a common plane and converging toward each other to form a common discharge portion where the flights are preferably in interdigitating relationship.

Yet another object is to provide a mining machine according to the foregoing object where the interdigitating flights of the discharge portion are driven from a common shaft to preserve the proper interdigitating relationship irrespective of the wear taking place in the elements making up the single endless conveyor.

A still further object is to provide a mining machine characterized by a single endless flight conveyor having a plurality of material receiving and conveying reaches spaced laterally of each other, such reaches thereafter converging for movement in interdigitating relationship in a common plane along a common discharge portion.

Another object is to provide a boring type miner having an extremely low vertical height and characterized by the ability to cut an extremely wide room in a single operation.

This application is a continuation of my application Serial No. 623,933, filed November 23, 1956 and now abandoned.

Other objects and important features of the invention will be apparent from a study of the specification following taken with the drawings which together describe a particular embodiment which the invention may assume in practice and an alternate embodiment thereof. Other embodiments may be suggested to those having the benefit of the teachings herein, and such other embodiments are intended to be reserved especially as they fall within the scope and spirit of the subjoined claims.

In the drawings:

Fig. 1 is a front elevational view of a boring type miner having the improvements according to the present invention embodied therein;

Fig. 3 is a bottom view showing the return reaches of said conveyors;

Fig. 4 is a schematic perspective view showing how an endless conveyor strand forming the two material conveying reaches are guided over sprockets at the material receiving and discharge portions of such conveyor strand;

Fig. 4A is a schematic perspective view showing how the endless strand may be guided to define three conveying reaches for a miner having three material receiving throats, said reaches converging into a common discharge portion with the three material conveying reaches in side by side or interdigitated relationship;

Fig. 5 is a section taken along the line 5—5 of Fig. 3 looking in the direction of the arrows, and showing how the conveying reaches are reversed in direction at the discharge end thereof upon sprockets mounted upon a common shaft;

Fig. 6 is an alternate embodiment thereof; and

Fig. 7 illustrates schematically a single chain conveyor having material moving flights extending therefrom, and showing how such a chain when guided as shown in Fig. 4 will have a 360° twist therein when removed in its endless condition from the guide sprockets therefor, and when the chain is stretched in a closed loop.

Figure 2:
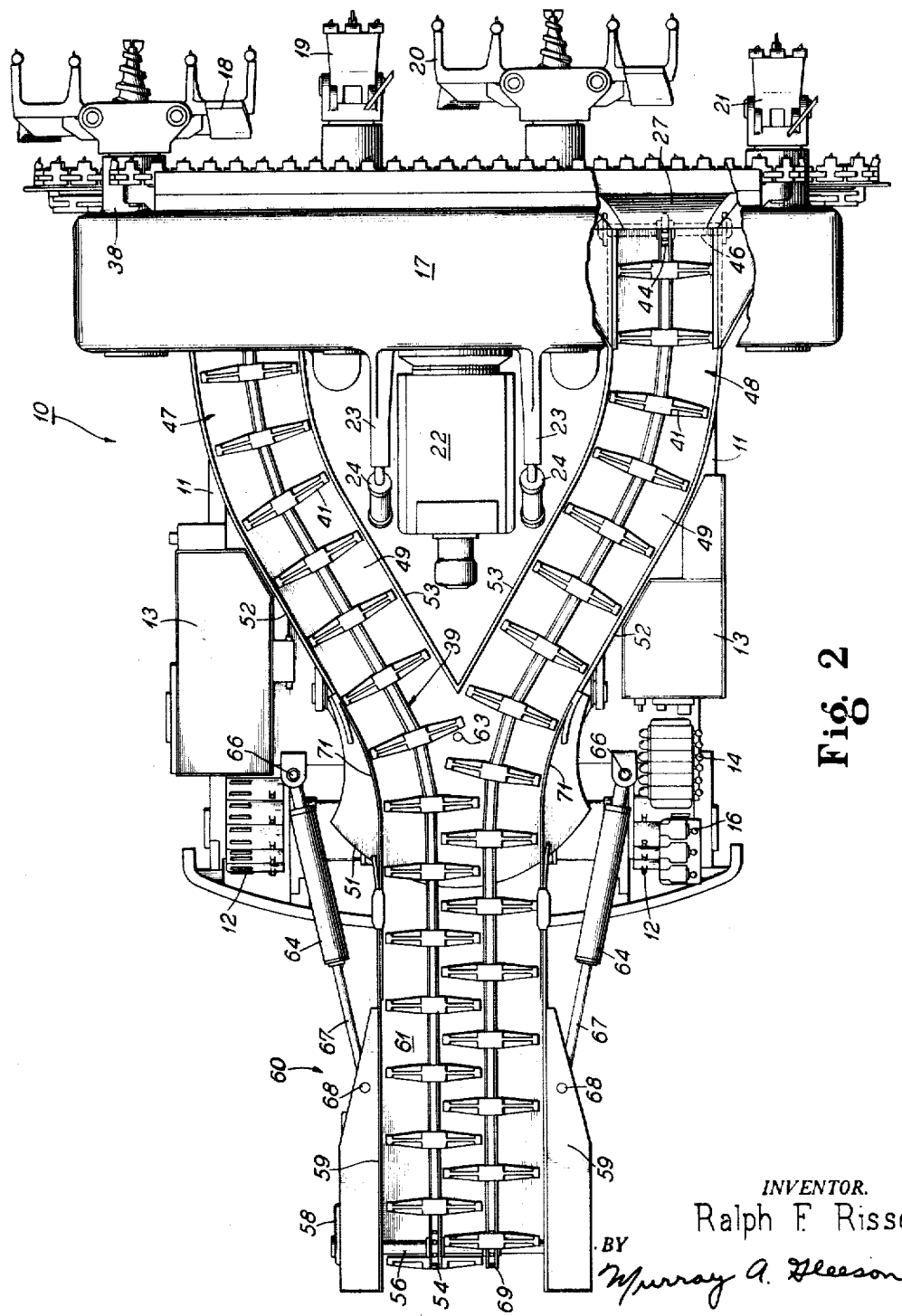
Fig. 2 is a plan view thereof, showing details of a single endless flight conveyor with material conveying reaches thereof laterally spaced from each other in a common plane and moving in side by side interdigitating relationship at a common discharge portion.

Referring now to the drawings there is shown a boring type continuous miner indicated generally by the reference numeral 10. Such a miner consists of a main frame 11 mounted for movement upon crawler treads 12. Control equipment for the miner 10 is shown at 13 and is mounted upon the frame 11 and is controlled from stations 14 and 16.

A boring head 17 is mounted upon the main frame 11 and has extending therefrom boring arms 18, 19, 20 and 21. These boring arms are driven from a motor 22 by means of gearing enclosed within the boring head 17 and as disclosed in the aforementioned Boesewetter patent. A pair of arms 23, 23 extend in a rearward direction from the boring head 17, and the position of boring head 17 with respect to the main frame 11 may be adjusted by lifting cylinders 24, 24 attached at one end to the arms 23 and at their other ends to the main frame 11.

As seen in Fig. 1, boring arms 18 and 19 rotate in fixed relationship with respect to each other in clockwise and counter-clockwise directions respectively, and operate to cut coal or other material from the solid vein thereof and move the fragmented material to a material receiving location or throat 26 between the boring arms 18 and 19 and below boring head 17. Boring arms 20 and 21 likewise rotate respectively in fixed relationship with boring arms 18 and 19 in clockwise and counter-clockwise directions to fragment the material and deliver same to a second material receiving location or throat 27, spaced laterally from material receiving throat 26, and between boring arms 20 and 21 and below boring head 17.

The operation of the four boring arms 18, 19, 20 and 21 is such as to leave behind upstanding and depending cusps, not shown. These cusps are removed by an endless cutter chain 25 having an upper run 28 and a lower run 29, the upper run 28 moving lengthwise of a guide 31 which can be raised or lowered by fluid operated cylinders 32 mounted on the boring head 17.

The lower run 29 likewise moves lengthwise of a lower guide 33 which in this embodiment of the invention is fixed relative to the boring head 17. The endless chain 25 is guided about sprockets 34 disposed at each end of the upper guide 31 and over idler sprockets 36 mounted at each end of the lower chain guide 33. The cutter chain 25 is driven by a sprocket 37 turning on the same center as the boring arm 21, and it is additionally guided around a hub 38 at the turning center of the boring arm 18.

Referring now to Figs. 2, 3 and 4 of the drawings, a single endless strand 39 having material moving flights 41 is reversed in direction about an idler sprocket 42 mounted on an idler shaft 43 disposed at the material receiving throat 26. As seen in the several views the endless strand 39 is in the form of a conveyor chain having the flights 41 extending therefrom with swivel connections between the chain 39 and the flights 41 to permit articulating movement of the chain 39 in its plane of travel, in a manner well known in the art.

As seen in Fig. 2, the endless chain 39 is also reversed in direction about an idler sprocket 44 mounted on an idler shaft 46 at the material receiving throat 27. It is to be noted that the idler shafts 43 and 46 have a substantially common axis of rotation extending laterally of the boring head 17 so that the idler sprockets 42 and 44 are positioned respectively adjacent the material receiving locations or throats 26 and 27. The reversal of the endless chain 39 at the sprockets 42 and 44 thereby provides cuttings conveying reaches 47 and 48 leading respectively from the laterally spaced material receiving throats 26 and 27. The two cuttings conveying reaches are guided over floor plates 49, 49 which merge at a fishtail plate 51 as seen in Fig. 2.

The flights 41 of each cutting conveying reach are constrained for movement between side plates 52 and 53. As seen in Fig. 4, the conveying reach 47 is guided about a driving sprocket 54 fast on a shaft 56 driven by a fluid motor 58. The driving shaft 56 is mounted between a pair of side frames 59, Figs. 3 and 5, having a floor plate 61 extending therebetween providing a guide for the conveying reaches 47 and 48. The side frames 59 and a lower floor plate 62 provide a guide for the return runs of the two conveying reaches 47 and 48.

The two side frames 59 define a discharge portion or boom 60 arranged to swing about a vertical axis 63, Figs. 2 and 3, the boom 60 being connected at such axis to the main frame 11 in a manner well known in the art. A pair of swing cylinders 64, Fig. 2, are connected at 66 to the main frame 11 and include pistons 67 pivotally connected at 68 to the frames 59 for swinging the discharge boom 60 also in a manner well known in the art.

It will be noted that the discharge portion 60 is spaced from the two material receiving throats 26 and 27, and that its longitudinal axis is substantially midway of said material receiving throats, and substantially perpendicular to an axis common to the shafts 43 and 46.

Referring now again to Fig. 4, the endless chain 39 is reeved in a plurality of load carrying reaches 47 and 48 and returns runs or reaches between the material receiving throats 26 and 27 and the discharge portion or boom 60. The conveying reach 47 is driven by the sprocket 54, and the endless chain 39 extends from the driving sprocket 54 to the idler sprocket 44 to be reversed in direction thereat to become the conveyor reach 48. The conveyor reach 48 is driven in fixed relationship with the conveyor reach 47 by a driving sprocket 69 also fast to the shaft 56, the endless chain 39 extending between the sprocket 69 and the idler sprocket 42 at the material receiving throat 26, where it is similarly reversed in direction to become conveying reach 47.

Referring back to Fig. 2, the side plates 52 are connected by a spring plate 71 to the side frame members 59 to guide the outer or extreme ends of the flights past the hinge 63. The flights 41 of the conveying reaches 47 and 48 are so related to each other as to interdigitate at a point near the pivot 63, thence to move in side by side interdigitated relationship as a discharge portion whence the material conveyed thereby can be discharged at the ends of the discharge boom 60. The side plates 59 thus constrain the extreme ends of the flights 41 as the conveying reaches move in such side by side relationship.

As seen in Fig. 6 it is necessary for only one of the flights 47 or 48 to be driven. Accordingly, the shaft 56 has only one driving sprocket 54 thereon, and the other driving sprocket 69 may be replaced by an idler shoe 72 if desired. However, it is preferable that two sprockets be employed so that each conveying reach is driven at its discharge end. Driving at two points also preserves substantially the same interdigitating relationship even though the elements of chain 39 wear considerably.

Referring now to Fig. 3, the two return runs for the conveying reaches 47 and 48 are guided in different planes. The return run for the conveying reach 48 is accordingly guided over a plate 73, see Fig. 5 also, extending between the frame members 59, and the return reach for the conveying reach 47 is guided beneath the underside of such plate as also seen in Fig. 5, and over plate 62 so that the two return reaches are maintained in different operating planes.

A side plate 74 for one end of the flights 41 on the return run for the conveying reach 47 is held between bottom plate 62 and plate 73 and merges with a spring plate 76 extending from the side frames 52 of conveying reach 47.

The corresponding opposite side of the return reach for the conveying reach 48 is guided by a curved plate 77 held between floor plate 61 and plate 73 which merges with a spring plate 78 extending from the side frame 52 of the conveying reach 48.

A spring plate 79 extends from the side frames 53 of each of the return reaches in the appropriate plane of the return runs to guide the other ends of the flights 41 on the return run depending upon the direction of swinging movement of the discharge section.

Means are provided for taking up the slack in the endless chain 39 occasioned by the swinging movement of the discharge boom. To this end each of the idler shafts 43 and 46 is mounted in a slot, not shown, in the side frames 52 and 53. The ends of the shafts 43 and 46 are constantly urged in a direction to take up the slack by means of a spring 81 bearing against a shaft support housing 82 and bearing against a stop 83 extending outward from the side frames 52 and 53, the spring being guided upon a rod 84, see Fig. 3.

Referring now to Fig. 7 of the drawings, it has been found that the endless chain 39 develops throughout its length a twist angle of 360°, although such an angle is not readily apparent from the manner in which the endless chain 39 is guided over the sprockets 42, 44, 54 and 69, seen in Fig. 4. Ordinarily a conveyor chain of the type referred to herein will not permit of twisting movement excepting for the manufacturing tolerances in the swivel joints at each flight 41. If it were possible to conceive of the endless chain 39 being removed in one continuous length from the aforesaid sprockets and stretched as a closed loop the endless chain would have the 360° twist seen in Fig. 7. If the upper reach shown in Fig. 7 is considered as one long conveying reach, then the return reach would have the 360° twist shown.

Referring now to Fig. 4A, it is possible according to the present invention to provide a multi-head boring machine having more than two material receiving throats. In either case a single endless strand can be employed for the conveying reaches and the return reaches. As seen in Fig. 4A there can be provided three material conveying reaches 86, 87 and 88 leading respectively from material receiving throats 89, 91 and 92, all such conveying reaches merging to move along a common discharge boom indicated generally by the reference numeral 93, where each such reach is reversed in direction about sprockets or pulleys 94, 96 and 97, all of which may be driven sprockets, or one of which may be a driving sprocket, the remainder being idler sprockets. In such alternate embodiment of the invention, for example, three separate planes would be provided for the return reaches.

Structure according to the present invention lends itself particularly to applications where the seam or vein is quite low and where it is desired to make as wide a cut as possible. While a conveyor chain 39 is shown having flights 41 extending therefrom, it is conceivable that a flexible cable having such flights could be employed as well. Where the claims recite an endless strand having material moving flights thereon, both endless chains and endless flexible cables are intended to be embraced, by way of example, and not by way of limitation.

While the invention has been described in terms of a preferred embodiment thereof and also an alternate embodiment its scope is intended to be limited only by the claims here appended.

I claim as my invention:

1. In a mining machine, a pair of laterally spaced material receiving throats, a discharge portion spaced from said material receiving throats and having its longitudinal axis substantially midway of said material receiving throats and substantially perpendicular to an axis common to said throats, a continuous single strand endless flight conveyor reeved in a plurality of load carrying reaches and return reaches between said discharge portion and said material receiving throats, strand direction reversing means at each of said throats to reverse a return reach at each throat into a load carrying reach, means constraining the flights of each of the load carrying reaches so that the load carrying reaches move convergently in a direction away from said throats, means constraining the extreme ends of the flights as they move along said discharge portion in a common plane whereby said single strand moves as two side by side conveying portions with the flights in interdigitating relationship, and strand direction reversing means at said discharge portion to reverse said side by side conveying portions into return reaches.

2. In a mining machine, a pair of laterally spaced material receiving throats, a discharge portion spaced from said material receiving throats and having its longitudinal axis substantially midway of said material receiving throats and substantially perpendicular to an axis common to said throats, a continuous single strand endless flight conveyor reeved in a plurality of load carrying reaches and return reaches between said discharge portion and said material receiving throats, strand direction reversing means at each of said throats to reverse a return reach at each throat into a load carrying reach, means constraining the flights of each of the load carrying reaches so that the load carrying reaches move convergently in a direction away from said throats, and means constraining the extreme ends of the flights as they move along said discharge portion in a common plane whereby said single strand moves as two side by side portions with the flights in interdigitating relationship.

3. In a mining machine, a pair of laterally spaced material receiving throats, a discharge portion spaced from said material receiving throats and having its longitudinal axis substantially midway of said material receiving throats and substantially perpendicular to an axis common to said throats, a continuous single strand endless flight conveyor reeved in a plurality of load carrying reaches and return reaches between said discharge portion and said material receiving throats, strand direction reversing means at each of said throats to reverse a return reach at each throat into a load carrying reach, means constraining the flights of each of the load carrying reaches so that the load carrying reaches move convergently in a direction away from said throats, means constraining the extreme ends of the flights as they move along said discharge portion in a common plane whereby said single strand moves as two side by side portions with the flights in interdigitating relationship, and means at said discharge portion for driving said side by side portions in fixed relationship.

4. In a mining machine, a pair of laterally spaced material receiving throats, a discharge portion spaced from said material receiving throats, a continuous single strand endless flight conveyor reeved in a plurality of load carrying reaches and return reaches between said discharge portion and said material receiving throats, strand direction reversing means at each of said throats to reverse a return reach at each throat into a load carrying reach, means for guiding said return reaches in different planes beneath the plane of said conveying reaches, means constraining the flights of each of the load carrying reaches so that the load carrying reaches move convergently in a direction away from said throats, and means constraining the extreme ends of the flights as they move along said discharge portion in a common plane whereby said single strand moved as two side by side portions with the flights in interdigitating relationship.

5. In a mining machine, a pair of laterally spaced material receiving throats, a discharge portion spaced from said material receiving throats, a continuous single strand endless flight conveyor reeved in a plurality of load carrying reaches and return reaches between said discharge portion and said material receiving throats, strand direction reversing means at each of said throats to reverse a return reach at each throat into a load carrying reach, means constraining the flights of each of the load carrying reaches so that the load carrying reaches move convergently in a direction away from said throats, means constraining the extreme ends of the flights as they move along said discharge portion in a common plane whereby said single strand moves as two side by side portions with the flights in interdigitating relationship, and means for swinging said discharge portion.

6. In a mining machine, a pair of laterally spaced material receiving throats, a discharge portion spaced from said material receiving throats, a continuous single strand endless flight conveyor reeved in a plurality of load carrying reaches and return reaches between said discharge portion and said material receiving throats, strand direction reversing means at each of said throats to reverse a return reach at each throat into a load carrying reach, means constraining the flights of each of the load carrying reaches so that the load carrying reaches move convergently in a direction away from said throats, and means constraining the extreme ends of the flights as they move along said discharge portion in a common plane whereby said single strand moves as two side by side portions with the flights in interdigitating relationship.

References Cited in the file of this patent

UNITED STATES PATENTS

| | | |
|---|---|---|
| 304,685 | Allen | Sept. 9, 1884 |
| 2,834,588 | Boesewetter | May 13, 1958 |